United States Patent
Schmidt

(10) Patent No.: US 8,947,596 B2
(45) Date of Patent: Feb. 3, 2015

(54) ALIGNMENT OF CLOSED CAPTIONS

(71) Applicant: Intel Corporation, Santa Clara, CA (US)

(72) Inventor: Johannes P. Schmidt, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/929,713

(22) Filed: Jun. 27, 2013

(65) Prior Publication Data

US 2015/0003797 A1     Jan. 1, 2015

(51) Int. Cl.
*H04N 5/14* (2006.01)
*H04N 5/445* (2011.01)
*G10L 15/22* (2006.01)
*G11B 27/30* (2006.01)

(52) U.S. Cl.
CPC ..................................... *G11B 27/30* (2013.01)
USPC ............................ 348/515; 348/468; 704/235

(58) Field of Classification Search
USPC .......... 348/515, 512, 564, 468; 704/243, 270; 715/201–204; 707/610, 611, 617
See application file for complete search history.

(56) References Cited

U.S. PATENT DOCUMENTS

| | | | |
|---|---|---|---|
| 6,172,675 B1 * | 1/2001 | Ahmad et al. ................. | 715/251 |
| 6,336,093 B2 * | 1/2002 | Fasciano ........................ | 704/278 |
| 6,442,518 B1 * | 8/2002 | Van Thong et al. ............ | 704/235 |
| 8,131,545 B1 * | 3/2012 | Moreno et al. ................. | 704/235 |
| 8,554,558 B2 * | 10/2013 | McCarley et al. ............. | 704/235 |
| 2002/0093591 A1 * | 7/2002 | Gong et al. ..................... | 348/515 |
| 2006/0100883 A1 * | 5/2006 | Miyamoto et al. ............. | 704/270 |
| 2009/0234864 A1 * | 9/2009 | Ellis et al. ...................... | 707/100 |
| 2010/0121936 A1 * | 5/2010 | Liu et al. ........................ | 709/217 |
| 2010/0332225 A1 * | 12/2010 | Arrowood et al. ............. | 704/235 |
| 2011/0040559 A1 * | 2/2011 | Kim et al. ....................... | 704/231 |
| 2011/0072466 A1 * | 3/2011 | Basso et al. ..................... | 725/47 |
| 2011/0134321 A1 * | 6/2011 | Berry et al. .................... | 348/464 |
| 2013/0080384 A1 * | 3/2013 | Briggs ............................ | 707/610 |
| 2013/0120654 A1 * | 5/2013 | Kuspa ............................. | 348/515 |

* cited by examiner

*Primary Examiner* — Victor Kostak
(74) *Attorney, Agent, or Firm* — Schwabe Williamson & Wyatt PC

(57) ABSTRACT

In embodiments, apparatuses, methods and storage media are described that are associated with alignment of closed captions. Video content (along with associated audio) may be analyzed to determine various times associated with speech in the video content. The video content may also be analyzed to determine various times associated with closed captions and/or subtitles in the video content. Likelihood values may be associated with the determined times. An alignment may be generated based on these determined times. Multiple techniques may be used, including linear interpolation, non-linear curve fitting, and/or speech recognition matching. Quality metrics may be determined for each of these techniques and then compared. An alignment for the closed captions may be selected from the potential alignments based on the quality metrics. The closed captions and/or subtitles may then be modified based on the selected alignment. Other embodiments may be described and claimed.

25 Claims, 8 Drawing Sheets

ALIGNMENT OF CLOSED CAPTIONS

TECHNICAL FIELD

The present disclosure relates to the field of data processing, in particular, to apparatuses, methods and systems associated with generating alignment of closed captions.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is consumed. In various scenarios, content may be consumed under varying circumstances, and by varying audiences. Video content may frequently include closed captions and/or subtitles that display text such as a transcript of speech that is occurring in the video content. However, in some video content, captions and/or subtitles may not line up, time-wise, with the speech that they are associated with.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
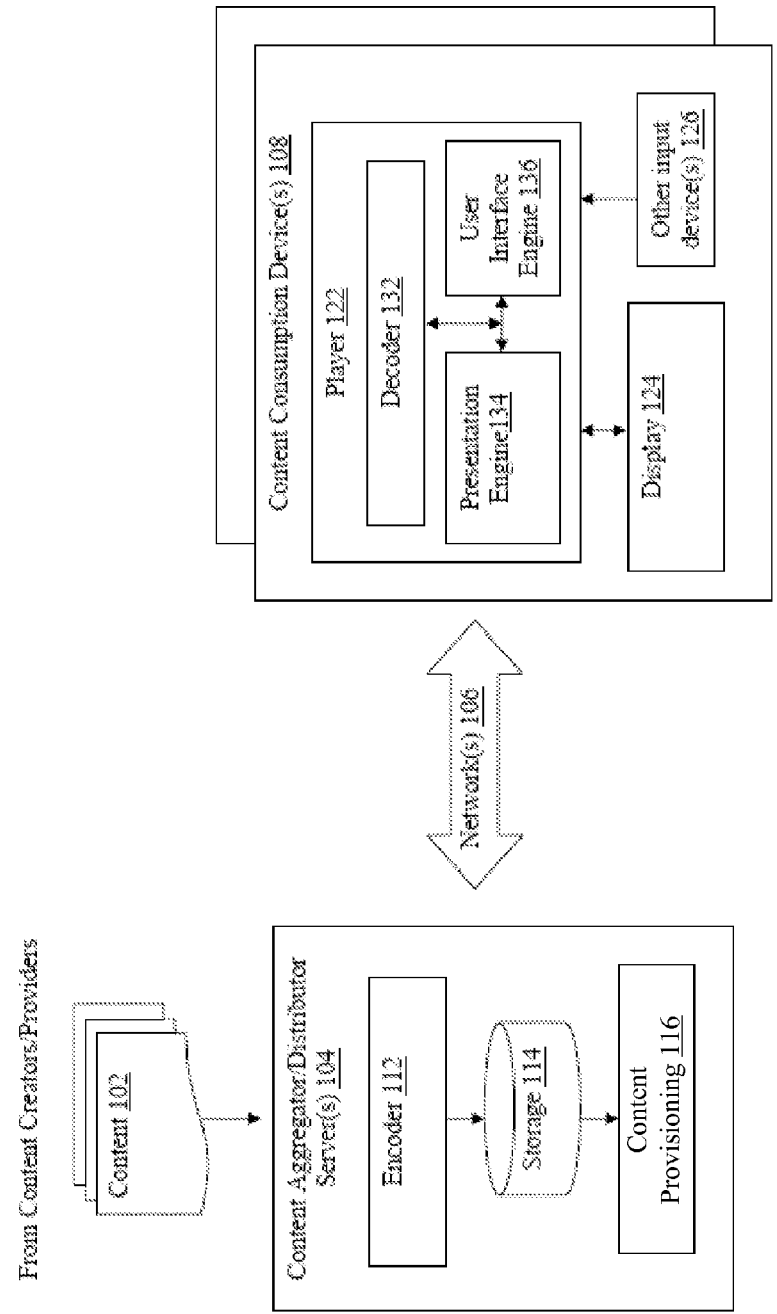
FIG. 1 illustrates an example arrangement for content distribution and consumption, in accordance with various embodiments.

Embodiments described herein are directed to, for example, methods, computer-readable media, and apparatuses associated with alignment of closed captions. In various embodiments, video content (along with associated audio) may be analyzed to determine various times associated with speech in the video content. The video content may also be analyzed to determine various times associated with closed captions and/or subtitles in the video content. In various embodiments, likelihood values may be associated with the determined times. In various embodiments, an alignment, which may include times and/or time offsets for closed captions, may be generated based on these determined times. Multiple techniques may be used to determine possible alignments, including linear interpolation, non-linear curve fitting, and/or speech recognition matching. Quality metrics may be determined for each of these techniques and then compared. An alignment for the closed captions may be selected from the potential alignments based on the quality metrics. The closed captions and/or subtitles may then be modified based on the selected alignment to re-align speech and closed captions in the video content.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content creators and/or providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube® video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

In various embodiments, although the terms "content" and/or "video content" are used herein for the sake of compactness, they may refer, in various embodiments, to video content along with associated audio. Additionally, while reference is made to "closed captions", this term may incorporate, in various embodiments, closed captions as well as subtitles. In various embodiments, encoder 112 may be configured to generate alignments for closed captions for content 102. In various embodiments, the encoder may include one or more modules, such as those described below with reference to FIG. 2, to perform alignment generation. In various embodiments, the encoder 112 may be configured to modify a closed caption track when encoding or transcoding the video content to align closed captions according to generate closed captions alignments. In other embodiments, however, other modules or entities may generate closed caption alignments. For example, in various embodiments, the player 112 of the content consumption device 108, may be configured to generate closed captions alignments during, or prior to presentation of video content. In various embodiments, the player 112 may perform closed caption generation through actions of the decoder 132 and/or the presentation engine 134.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory.

Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and input device(s) 126. Player 122 may be configured to receive streamed content, decode and recover the content from the content stream, and present the recovered content on display 124, in response to user selections/inputs from input device(s) 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from input device 126 that are indicative of the user selections/inputs from a user, and to selectively render a contextual information interface as described herein.

While shown as part of a content consumption device 108, display 124 and/or input device(s) 126 may be stand-alone devices or integrated, for different embodiments of content consumption devices 108. For example, for a television arrangement, display 124 may be a stand alone television set, Liquid Crystal Display (LCD), plasma and the like, while player 122 may be part of a separate set-top set, and input device 126 may be a separate remote control (such as described below), gaming controller, keyboard, or another similar device. Similarly, for a desktop computer arrangement, player 122, display 124 and input device(s) 126 may all be separate stand alone units. On the other hand, for a tablet arrangement, display 124 may be a touch sensitive display screen that includes input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and input device(s) 126 may be likewise integrated.

Figure 2:
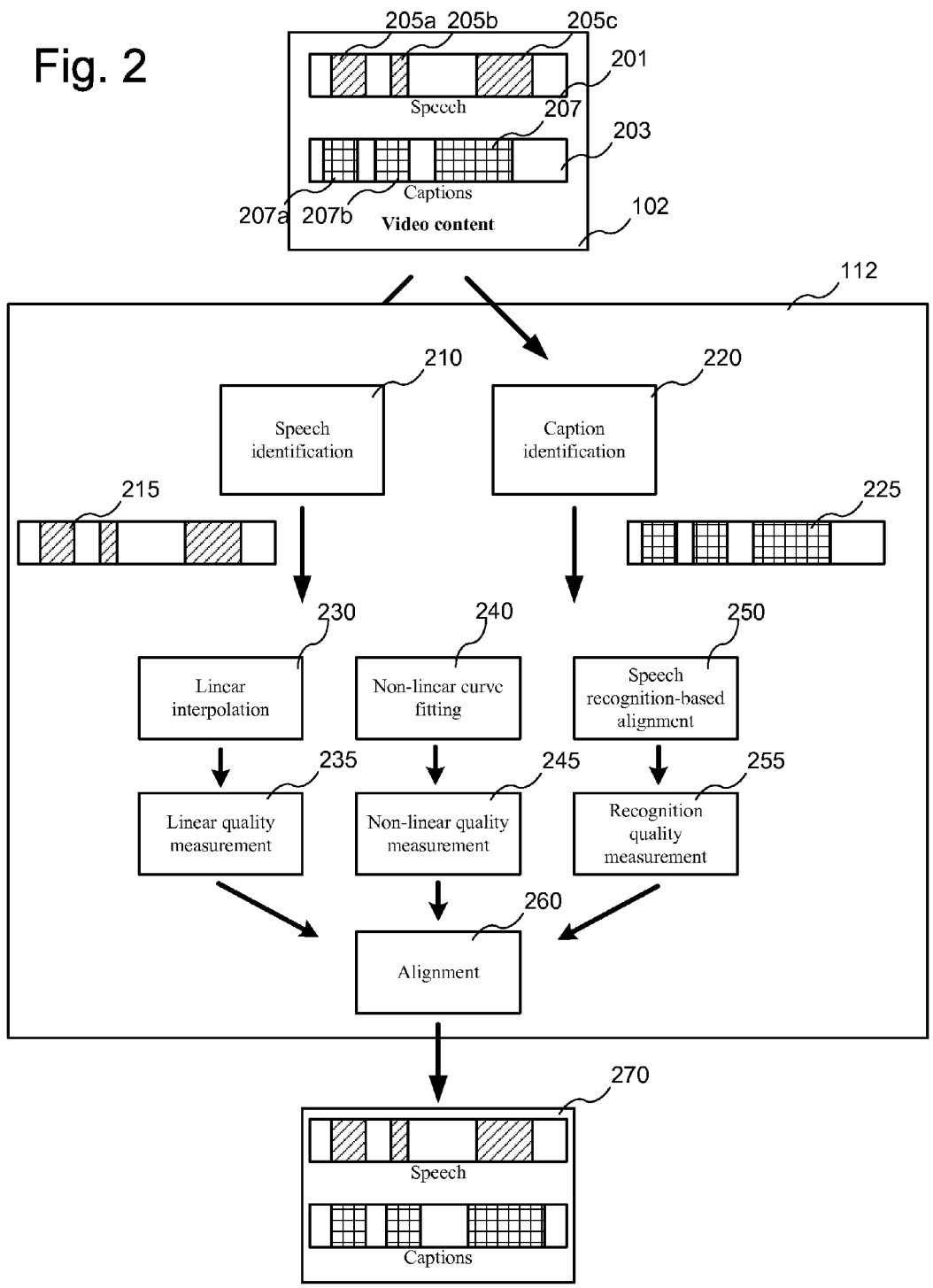
FIG. 2 illustrates an example arrangement for alignment of closed captions, in accordance with various embodiments.

Referring now to FIG. 2, an example arrangement for alignment of closed captions is shown in accordance with various embodiments. As discussed above, in various embodiments, a module of the content aggregator/distributor server 104, such as the encoder 112, may itself include various modules configured to perform closed caption alignment techniques described herein. While particular examples of alignment generation modules are provided in the example of FIG. 2, it may be recognized that, in various embodiments, other techniques may be used in addition to, or in lieu of, those illustrated.

In various embodiments, the encoder 112 may be configured to receive content 102 as input, as described above. In various embodiments, content 102 may be video content. In various embodiments, the content 102 may include one or more audio track(s) 201. In various embodiments, these audio track(s) may, in turn, include one or more portions of speech, such as speech portions 205a-205c. As illustrated in the example of FIG. 2, in various embodiments, the speech portions may be of different lengths and may be found at different times within the audio track(s) 201. In various embodiments, the content 102 may also include a closed caption track 203, which may include one or more portions where closed captions are found, such as caption portions 207a-207c. As illustrated in the example of FIG. 2, in various embodiments, the speech portions 205a-205c and caption portions 207a-207c may not be aligned in the content as received by the encoder 112. Additionally, this misalignment may change from portion to portion. Thus, in various embodiments, while speech portion 205a is relatively aligned with caption portion 207a, caption portions 207b and 207c start earlier than the corresponding speech portions 205b and 205c. Additionally, caption portion 207c starts much earlier, relative to its corresponding speech portion 205c, than does caption portion 207b to speech portion 205b. As such, in various embodiments, the encoder 112 may be configured to generate alignments where different closed captions are moved in different amounts than other closed captions.

In various embodiments, caption alignment generation may be performed on portions of content 102 of different sizes. Thus, in some embodiments, a closed caption alignment may be generated for the entirety of content 102. In other embodiments, the encoder 112 may generate closed caption alignments for smaller portions of the content 102. These small portions may range down to multiple portions a second, such as 1/30s portions. In some embodiments, the portions may be related to a frame rate of the content 102. In some embodiments, the audio track 201 and the closed caption track 203 may be considered at different sample rates. For example, the audio track 201 may be sampled at a rate of 1/30s while the closed caption track 203 may be sampled at a rate of 1/10s.

In various embodiments, the encoder 112 may be configured to determine the times within the content at which speech is most likely to be found. In various embodiments, the encoder 112 may include a speech identification module 210 ("SI 210") to perform such determinations. In various embodiments, this SI 210 may be configured to determine one or more times at which speech is likely to occur in the audio track(s) 201 of the content 102. In various embodiments, the SI 210 may be configured to isolate one or more frequency ranges which are used for human speech from the audio track(s) 201 for analysis. In various embodiments, the SI 210 may be configured to measure energy levels from the isolated frequency ranges to determine when speech is likely to be occurring. In various embodiments, the SI 210 may be configured, either instead of, or in addition to, the energy measurement, to perform speech recognition on the audio tracks to further determine likelihoods of whether speech is present. In various embodiments, the SI 210 may be configured to output one or more likelihood values, represented by likelihood values 215. In various embodiments, the likelihood values may vary over ranges. In some embodiments, the SI 210 may be configured to normalize these likelihood values 215 to pre-determined ranges. In other embodiments, the output likelihood values 215 may be simple Boolean-style "speech or no speech" values, such as are shown in the example of FIG. 2 for ease of illustration. Such Boolean values may be generated by comparing a likelihood value to one or more pre-determined threshold values. Particular techniques for determining likelihood values may be understood by one of ordinary skill.

In various embodiments, the encoder 112 may also be configured to determine the times within the content at which speech-related captions are most likely to be found. In various embodiments, the encoder 112 may include a caption identification module 220 ("CI 220") to perform such determinations. In various embodiments, this CI 220 may be configured to determine one or more times at which speech-related captions are likely to occur in the caption track(s) 203 of the content 102. In various embodiments, the CI 220 may be configured to determine closed captions which are not related to speech. In various embodiments, these non-speech related captions may include musical cues, sound-effect captions, closed caption credits, etc. In various embodiments, the CI 220 may be configured to determine non-speech related closed captions by identifying characters, codes, or formatting that identifies closed captions as being not-related to speech. In some embodiments, the CI 220 may be configured to perform semantic analysis of closed captions from the closed caption track 203 to determine which are speech-related and which are not speech related. In various embodiments, the SI 210 may be configured to output one or more likelihood values, represented by likelihood values 225. In various embodiments, the likelihood values may vary over ranges. In some embodiments, the CI 220 may be configured to normalize these likelihood values 225 to pre-determined ranges. In other embodiments, the output likelihood values 225 may be simple binary "speech-related or not speech-related" values, such as are shown in the example of FIG. 2 for ease of illustration. Such Boolean values may be generated by comparing a likelihood value to one or more pre-determined threshold values. Particular techniques for determining likelihood values may be understood by one of ordinary skill.

In various embodiments, the encoder 112 may contain one or more closed caption alignment generation modules configured to generate potential closed caption alignments. In various embodiments, these generated alignments may include times and/or time offsets configured to re-align closed captions and speech found in the video content. In various embodiments, these modules may be configured to generate these potential closed caption alignments based on the speech likelihood values 215 and the caption likelihood values 225 received from the SI 210 and the CI 220, respectively. Thus, for example, in various embodiments, the encoder 112 may include a linear interpolation module 230, configured to perform linear interpolation on the speech likelihood values 215 and the caption likelihood values 225 to determine an alignment. In various embodiments, this linear interpolation may be performed according to known techniques. In various embodiments, the encoder 112 may also include a non-linear curve-fitting module 240, configured to perform non-linear curve fitting on the speech likelihood values 215 and the caption likelihood values 225 to determine an alignment. In various embodiments, this curve fitting may be performed according to known techniques. In various embodiments, the linear interpolation module 230 and/or the on-linear curve-fitting module 240 may be configured to smooth one or more of the speech likelihood values 215 and the caption likelihood values 225. Additionally, in various embodiments, the linear interpolation module 230 and/or the on-linear curve-fitting module 240 may be configured to use different value determinations in their interpolation and/or curve fitting, such as by adding likelihood values and/or determining a square of difference of likelihood values.

In various embodiments, the encoder 112 may also include a speech-recognition-based alignment generation module 250 that may be configured to generate an alignment by performing speech recognition on the audio track 201 (or just the portions that are identified as likely to be speech by the SI 210) and matching that speech with text recognition of the closed caption track 203 (or just the portions that are identified as likely to be speech-related by the CI 220). In some embodiments, the speech-recognition-based alignment generation module 250 may be configured to analyze video in the content 102 to determine times during which mouths may be moving and generate higher likelihood values for these times.

In various embodiments, the encoder 112 may include one or more quality measurement modules that may be configured to determine quality metrics for the generated potential alignments. Thus, in various embodiments, the encoder 112 may include a linear quality measurement module 235 configured to determine a quality metric for the closed caption alignment generated by the linear interpolation module 230. Similarly, in various embodiments, the encoder 112 may include a non-linear quality measurement module 245 configured to determine a quality metric for the closed caption alignment generated by the non-linear curve-fitting module 240. Additionally, in various embodiments, the encoder 112 may include a Recognition quality measurement module 255 configured to determine a quality metric for the closed caption alignment generated by the speech recognition-based alignment module 250.

In various embodiments, the measurement modules 235, 245, and 255 may be configured to modify the caption track according to their corresponding generated caption alignment and then to compare the modified caption track to the determined caption likelihood values 225. In various embodiments, the comparison may be based on various error value determinations, such as a sum of differences or sum of squares of differences, as will be understood. In various embodiments, the encoder 112 may include an alignment module 260, which may select one of the generated potential alignments based on the determined quality metrics. The alignment module 260 may then output a modified video content 270. The modified video content 270 may include a re-alignment of the closed caption track 203 and the audio track 201, to re-align speech and the closed captions in the video content. This re-alignment may be performed, in various embodiments, through modification of the closed caption track 203 and/or the audio track 201.

Figure 3:
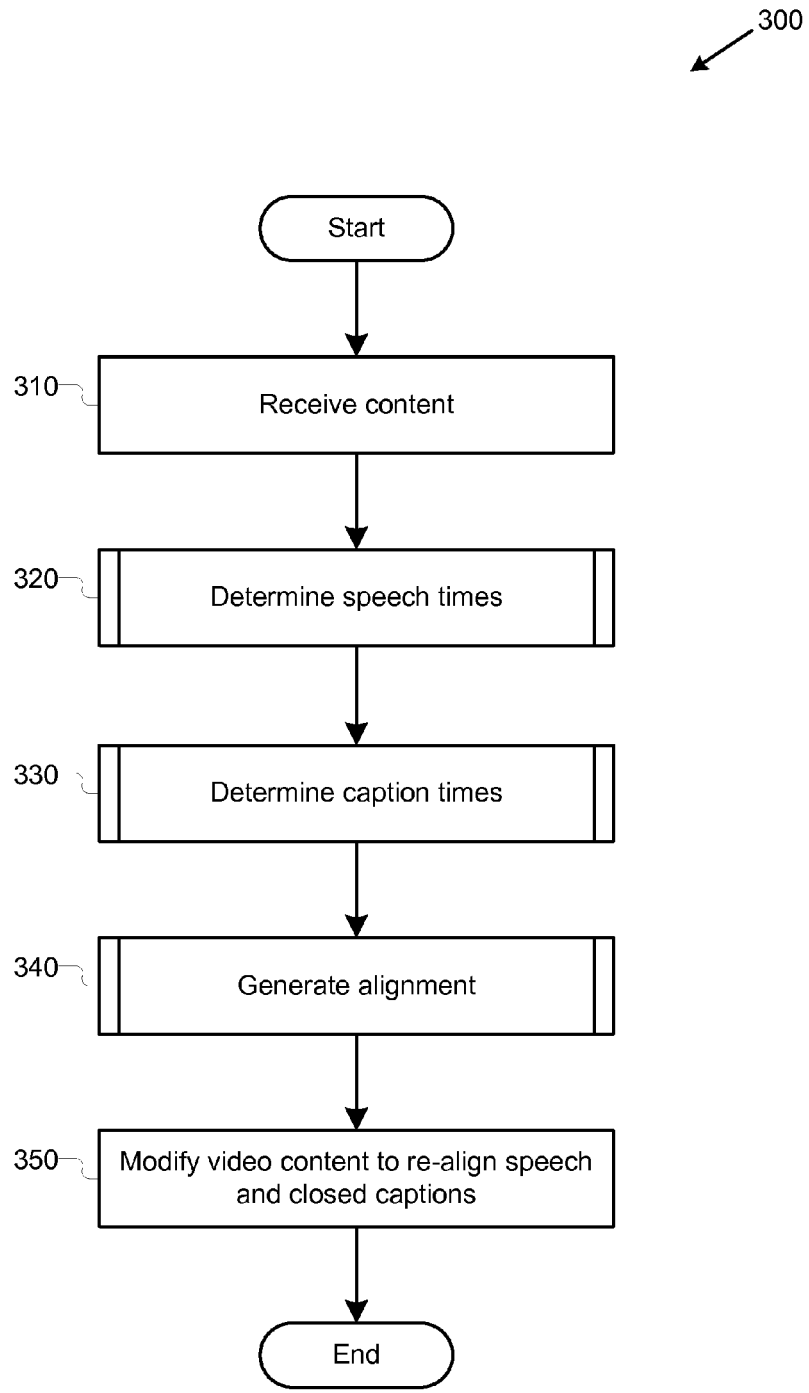
FIG. 3 illustrates an example process for aligning closed captions, in accordance with various embodiments.

Referring now to FIG. 3, an example process 300 for aligning closed captions is illustrated in accordance with various embodiments. While FIG. 3 illustrates particular example operations for process 300, in various embodiments, process 300 may include additional operations, omit illustrated operations, and/or combine illustrated operations. In various embodiments, process 300 may be performed by the encoder 112 of the content aggregator/distributor server 104. However, as discussed herein in other embodiments, process 300 may be performed by other entities, such as in the content consumption device 104. While process 300 is shown as a single, linear process, in various embodiments, the process may be repeated one or more times for various portions of content.

The process may begin at operation 310, where the encoder 112 may receive content 102. Next, at operation 320, the SI 210 of the encoder 112 may determine times associated with speech. Particular implementations of operation 320 are described below with reference to operation 400 of FIG. 4. Next, at operation 330, the CI 220 of the encoder 112 may determine times associated with speech-related closed captions. Particular implementations of operation 330 are described below with reference to operation 500 of FIG. 5. Next, at operation 340, the encoder 112 may generate a closed caption alignment. Particular implementations of operation 340 are described below with reference to operation 600 of FIG. 6. Next, at operation 350, the video content may be modified to re-align speech and closed captions in the video content. The process may then end.

Figure 4:
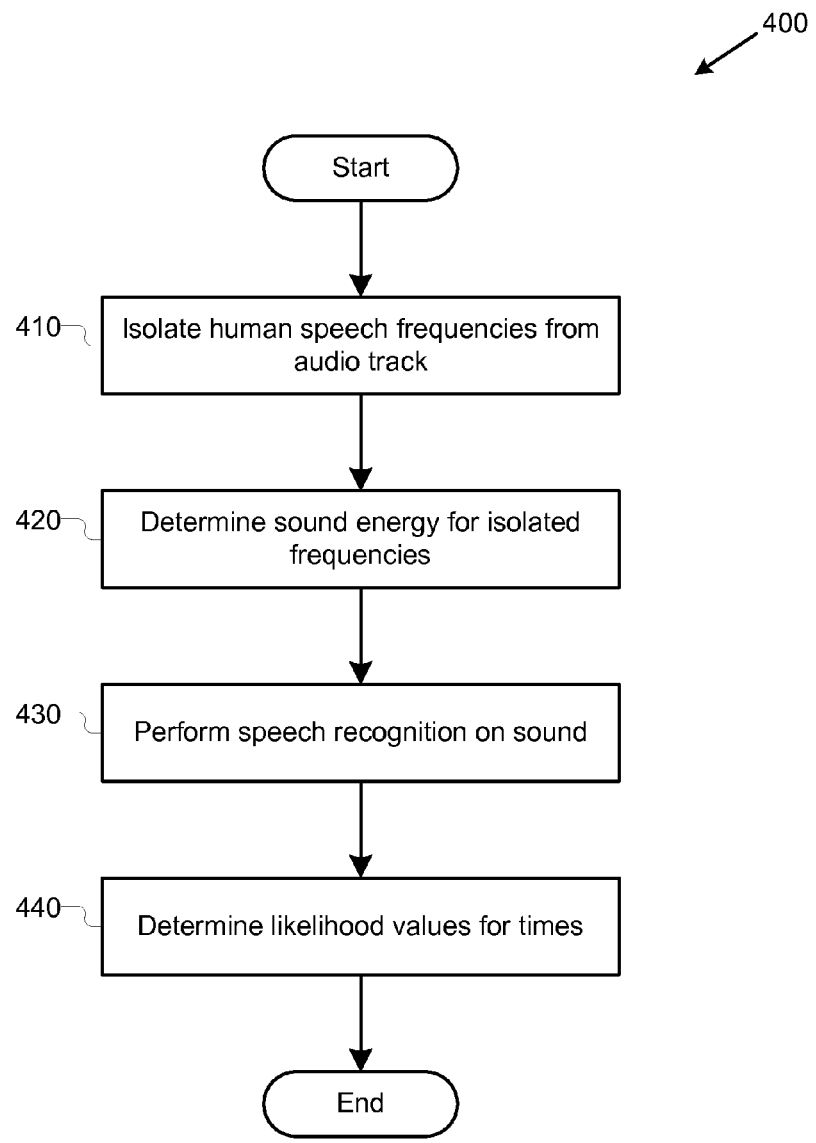
FIG. 4 illustrates an example process for determining times associated with speech, in accordance with various embodiments.

Referring now to FIG. 4, an example process 400 for determining times associated with speech is illustrated in accordance with various embodiments. While FIG. 4 illustrates particular example operations for process 400, in various embodiments, process 400 may include additional operations, omit illustrated operations, and/or combine illustrated operations. Various embodiments of process 400 may implement operation 320 of process 300 of FIG. 3. In various embodiments, process 400 may be performed by the SI 210. In various embodiments, the SI 210 may determine times which are associated with speech by determining speech likelihood values for various times in the content.

The process may begin at operation 410, where the SI 210 may isolate human speech frequencies from the audio track 201. Next, at operation 420, the SI 210 may determine sound energy for the isolated frequencies for various times. Next, at operation 430, the SI 210 may perform speech recognition on the sound. Then, at operation 440, the SI may determine likelihood values for various times associated with the audio track 201 of the content 102. The process may then end. It may be recognized that, in various embodiments, the SI 210 may perform only the energy analysis of operation 420, only the speech recognition of operation 430, and/or both. In other embodiments, other forms of speech likelihood value determination may be performed, such as, for example, through analysis of a center audio channel, where speech is likely to be found.

Figure 5:
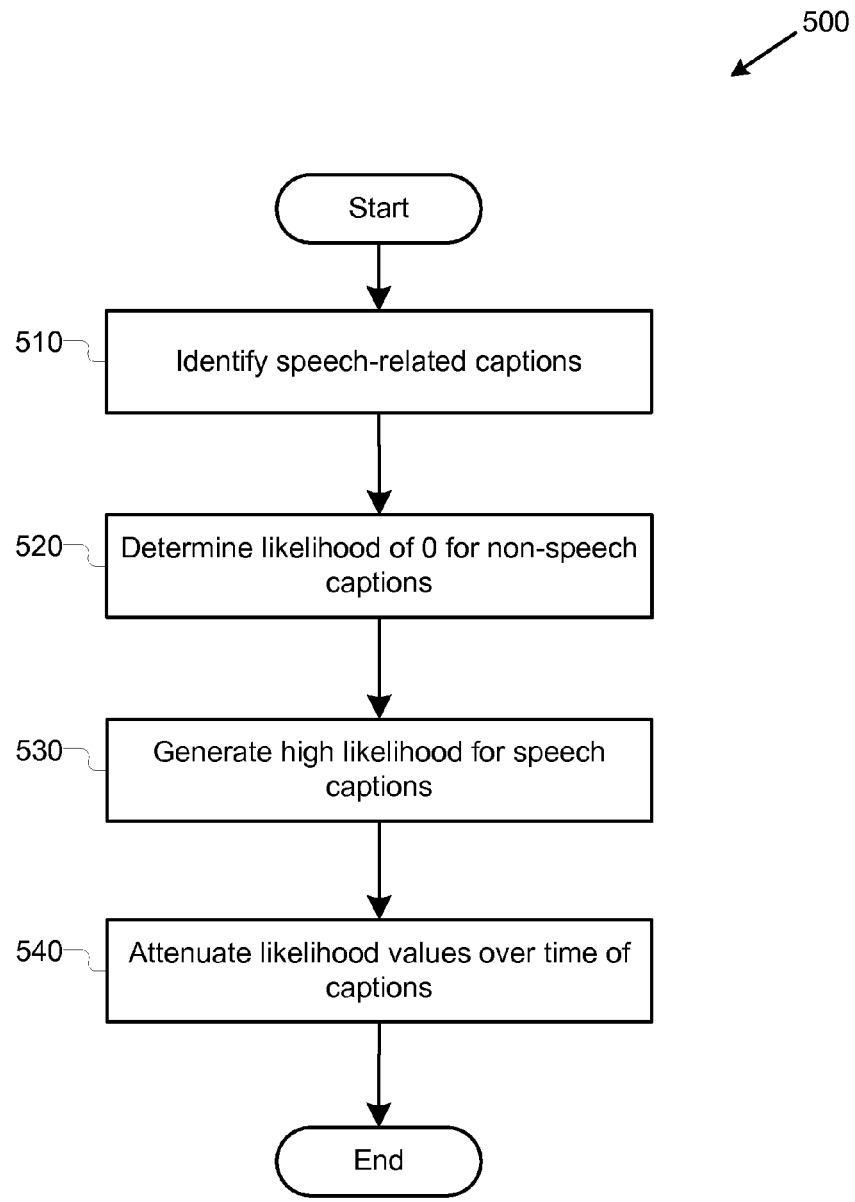
FIG. 5 illustrates an example process for determining times associated with speech-related closed captions, in accordance with various embodiments.

Referring now to FIG. 5, an example process 500 for determining times associated with speech-related closed captions is illustrated in accordance with various embodiments. While FIG. 5 illustrates particular example operations for process 500, in various embodiments, process 500 may include additional operations, omit illustrated operations, and/or combine illustrated operations. Various embodiments of process 500 may implement operation 330 of process 300 of FIG. 3. In various embodiments, process 500 may be performed by the CI 220.

The process may begin at operation 510, where the CI 220 may identity speech-related closed captions from the closed caption track 203. As discussed above, in various embodiments, the CI 220 may identify speech-related closed captions from non-speech-related closed captions through semantic analysis of text, or by identifying delimiting codes, symbols, and/or formatting. Next, at operation 520, the CI 220 may determine a caption likelihood value of 0 for times where there are no closed captions for which captions are determined to be non-speech-related. Next, at operation 530, the CI 220 may determine relatively high likelihood values for times associated with speech-related closed captions. Then, at operation 540, the CI 220 may attenuate caption likelihood values over the time the captions are displayed. Thus, after operation 540, if a speech-related caption is displayed for, for example, the seconds, caption likelihood values associated with the first second of the caption may be left high, but may drop off over the course of the remaining two seconds. By performing this attenuation, the CI 220 may better insure that the initial display of closed captions is best matched to its associated speech when closed caption alignments are generated. The process may then end.

Figure 6:
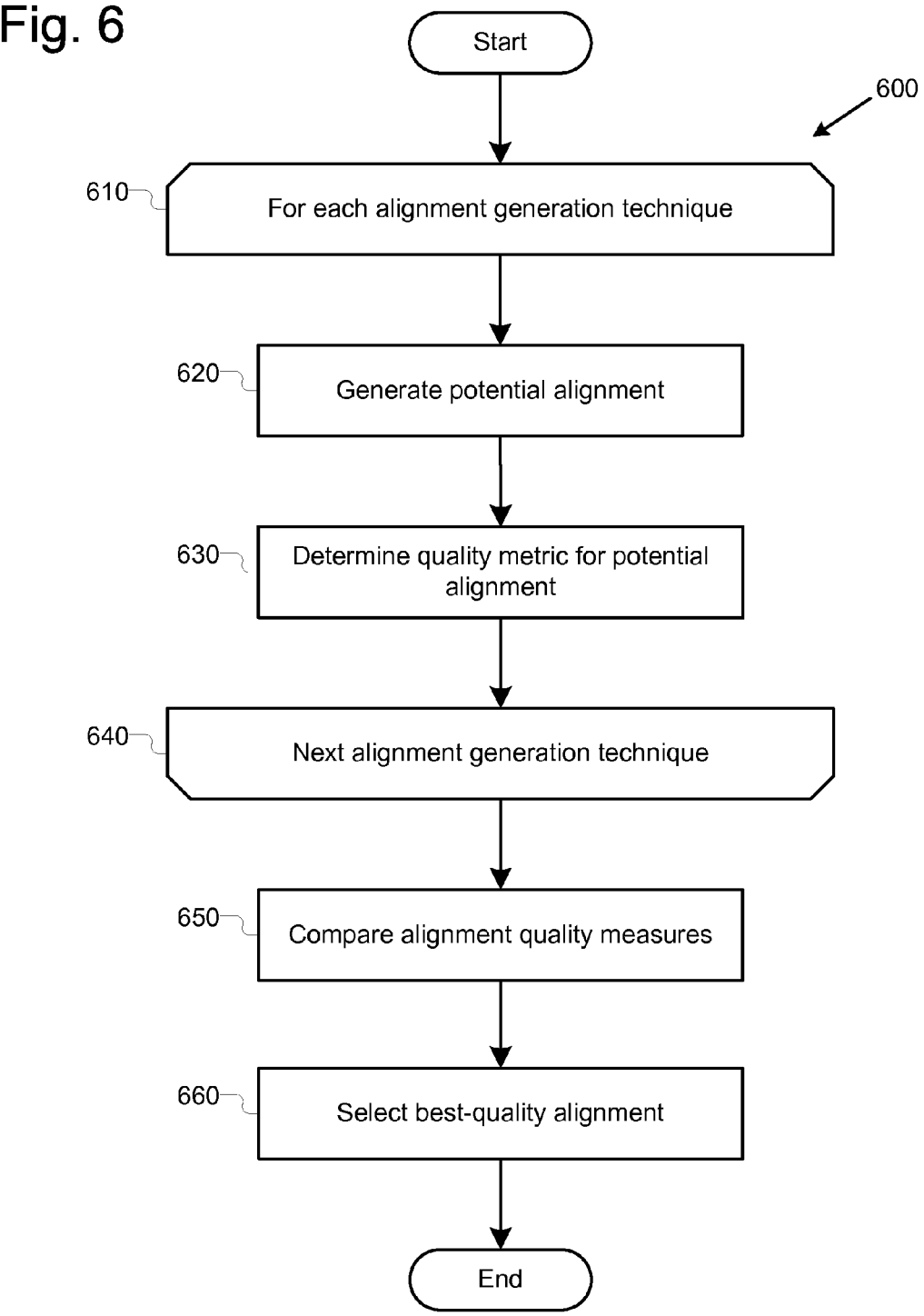
FIG. 6 illustrates an example process for generating closed caption alignments, in accordance with various embodiments.

Referring now to FIG. 6, an example process 600 for generating closed caption alignments is illustrated in accordance with various embodiments. While FIG. 6 illustrates particular example operations for process 600, in various embodiments, process 600 may include additional operations, omit illustrated operations, and/or combine illustrated operations. Various embodiments of process 600 may implement operation 340 of process 300 of FIG. 3.

The process may begin at operation 610, where a loop may be started for each available closed caption alignment technique (e.g., linear interpolation, non-linear curve fitting, speech recognition, etc.). Next, at operation 620, a potential closed caption alignment may be generated, such as by one of the closed caption alignment generation modules 230, 240, or 250. Next, at operation 630, a quality metric may be determined for the generated potential alignment, such as discussed above. The quality metric may be generated by a quality measurement module, such as modules 235, 245, or 255. Next, at operation 640, the loop may be repeated for a next alignment generation technique. Next, at operation 650, the alignment module 260 may compare alignment quality metrics, and, at operation 660, may select the best-quality alignment. The process may then end. In various embodiments, it may be recognized that, because process 300 (and thus process 600) may be repeated for different portions, performance of operation 660 may cause different closed caption alignments to be generated for different portions of content, even when they may be adjacent to each other.

Figure 7:
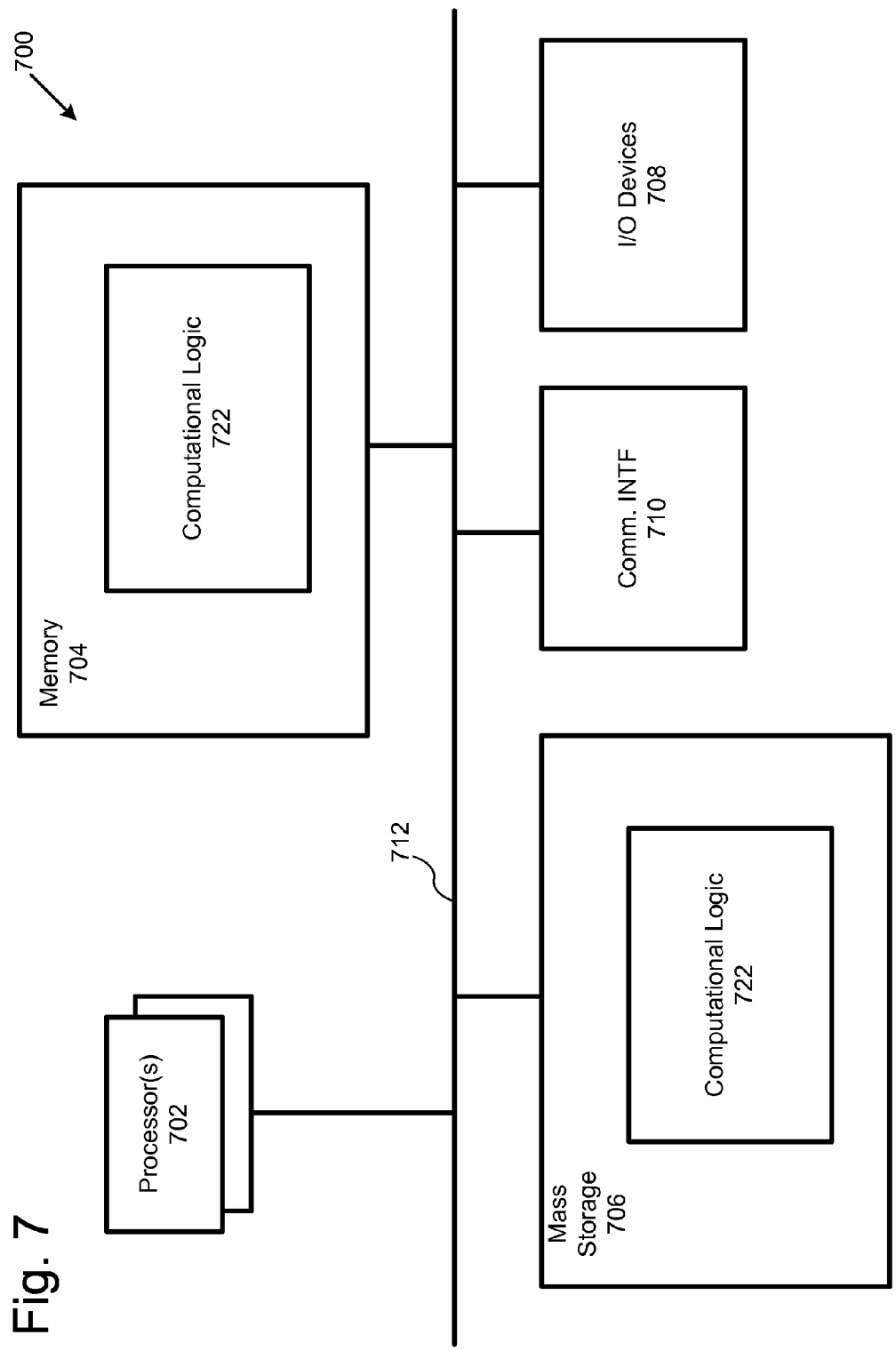
FIG. 7 illustrates an example computing environment suitable for practicing various aspects of the present disclosure, in accordance with various embodiments.

Referring now to FIG. 7, an example computer suitable for practicing various aspects of the present disclosure, including processes of FIGS. 3-6, is illustrated in accordance with various embodiments. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control, remote control, gaming controller, image capture device, and so forth) and communication interfaces 710 (such as network interface cards, modems, infrared receivers, radio receivers (e.g., Bluetooth), and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with content aggregator/distributor server 104, and in particular, encoder 112, as shown in FIGS. 3-6. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computer 700 is used as a content aggregator/distributor server 104 or a content consumption device 108 (e.g., a player 122). Their constitutions are otherwise known, and accordingly will not be further described.

Figure 8:
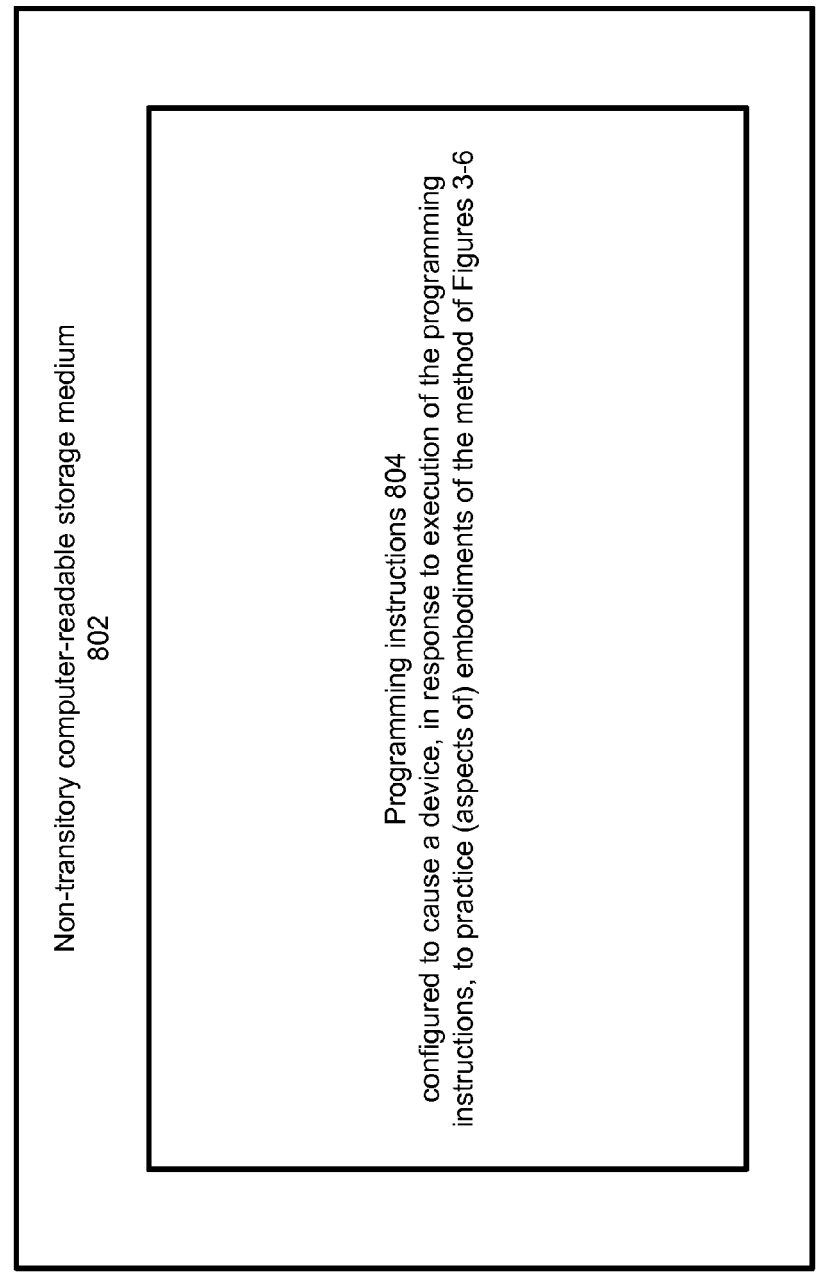
FIG. 8 illustrates an example storage medium with instructions configured to enable an apparatus to practice various aspects of the present disclosure, in accordance with various embodiments.

FIG. 8 illustrates an example least one computer-readable storage medium 802 content aggregator/distributor server 104, and in particular, encoder 112, earlier described, in accordance with various embodiments. As illustrated, least one computer-readable storage medium 802 may include a number of programming instructions 804. Programming instructions 804 may be configured to enable a device, e.g., computer 700, in response to execution of the programming instructions, to perform, e.g., various operations of processes of FIGS. 3-6, e.g., but not limited to, to the various operations performed to perform generation of closed caption alignments. In alternate embodiments, programming instructions 804 may be disposed on multiple least one computer-readable storage media 802 instead.

Referring back to FIG. 7, for one embodiment, at least one of processors 702 may be packaged together with computational logic 722 configured to practice aspects of processes of FIGS. 3-6. For one embodiment, at least one of processors 702 may be packaged together with computational logic 722 configured to practice aspects of processes of FIGS. 3-6 to form a System in Package (SiP). For one embodiment, at least one of processors 702 may be integrated on the same die with computational logic 722 configured to practice aspects of processes of FIGS. 3-6. For one embodiment, at least one of processors 702 may be packaged together with computational logic 722 configured to practice aspects of processes of FIGS. 3-6 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 includes a method for presenting video content. The method comprises, prior to presenting the video content, determining, by a computing device, for the video content, one or more first times associated with speech in the video content. The method also comprises, prior to presenting the video content, determining, by the computing device, for the video content, one or more second times associated with closed captions in the video content. The method also comprises, prior to presenting the video content, re-aligning, by the computing device, relative presentation of the speech and the closed captions in the video content, based on the determined first and second times.

Example 2 includes the method of Example 1, wherein determining one or more first times associated with speech comprises determining speech likelihood values for the one or more first times of the video content.

Example 3 includes the method of Example 2, wherein determining speech likelihood values comprises determining speech likelihood values based on measuring sound energy of the video content at the one or more first times.

Example 4 includes the method of Example 3, wherein the sound energy is sound energy in a frequency range of human speech.

Example 5 includes the method of Example 2, wherein determining speech likelihood values comprises performing speech recognition on the video content.

Example 6 includes the method of Example 2, wherein determining speech likelihood values comprises performing face recognition to determine when one or more mouths are moving in the video content.

Example 7 includes the method of any one of Examples 1-6, wherein determining one or more second times associated with closed captions comprises determining caption likelihood values for the one or more second times of the video content.

Example 8 includes the method of Example 7, wherein determining caption likelihood values for one or more times of the video content comprises determining times when closed captions are encoded.

Example 9 includes the method of Example 8, wherein determining caption likelihood values for one or more frames of the video content further comprises: identifying one or more first closed captions that are related to speech, identifying one or more second closed captions that are not related to speech, and generating higher caption likelihood values for times associated with the one or more first closed captions.

Example 10 includes the method of Example 9, wherein generating high captions likelihood values comprises generating high caption likelihood values for times when the one or more first closed captions are displayed and attenuating the caption likelihood values over time periods of display of the one or more first closed captions.

Example 11 includes the method of any of Examples 1-10, wherein the method further comprises generating, by the computing device, an alignment for the closed captions based on the determined first and second times and re-aligning relative presentation of the speech and the closed captions comprises re-aligning based at least in part on the generated alignment.

Example 12 includes the method of Example 11, wherein generating an alignment for the closed captions comprises performing a linear interpolation on the one or more first times and the one or more second times.

Example 13 includes the method of Example 11, wherein generating an alignment for the closed captions comprises performing a non-linear curve fitting on the one or more first times and the one or more second times.

Example 14 includes the method of Example 11, wherein generating an alignment for the closed captions comprises matching recognized speech in the video at the one or more first times with text from closed captions at the one or more second times.

Example 15 includes the method of Example 11, wherein generating an alignment for the closed captions comprises generating multiple potential closed caption alignments; determining, for each of the potential closed caption alignments, respective quality metrics for the generated potential closed caption alignments; and selecting a potential closed caption alignment from the generated potential closed caption alignments based at least in part on the determined quality metrics.

Example 16 includes the method of any of Examples 1-15, wherein re-aligning relative presentation of the speech further comprises modifying the video content based on the generated alignment.

Example 17 includes the method of Example 16, wherein modifying the video content comprises modifying times during which the closed captions are displayed.

Example 18 includes the method of any of Example 1-17, wherein the video content comprises audio content.

Example 19 includes the method of any of Examples 1-18, wherein determining one or more first times, determining one or more second times, and re-aligning are performed prior to provisioning of the video content for presentation.

Example 20 includes an apparatus for presenting video content. The apparatus comprises one or more computer processors. The apparatus also comprises a speech identification module configured to operate on the one or more computer processors to determine, prior to presentation of the video content, one or more first times associated with speech in the video content. The apparatus also comprises a caption identification module configured to operate on the one or more computer processors to determine, prior to presentation of the video content, one or more second times associated with closed captions in the video content. The apparatus also comprises an alignment module, operatively coupled to the speech identification module and the caption identification module, and configured to operate on the one or more computer processors to output, to re-align, prior to presentation of the content, relative presentation of the speech and the captioned content in the video content, based on the determined first and second times.

Example 21 includes the apparatus of Example 20, wherein determine one or more first times associated with speech comprises determine speech likelihood values for the one or more first times of the video content.

Example 22 includes the apparatus of Example 21, wherein determine speech likelihood values comprises determine speech likelihood values based on measure of sound energy of the video content at the one or more first times.

Example 23 includes the apparatus of Example 22, wherein the sound energy is sound energy in a frequency range of human speech.

Example 24 includes the apparatus of Example 21, wherein determine speech likelihood values comprises perform speech recognition on the video content.

Example 25 includes the apparatus of Example 21, wherein determine speech likelihood values comprises performing face recognition to determine when one or more mouths are moving in the video content.

Example 26 includes the apparatus of any one of Examples 20-25, wherein determine one or more second times associated with closed captions comprises determine caption likelihood values for the one or more second times of the video content.

Example 27 includes the apparatus of Example 26, wherein determine caption likelihood values for one or more times of the video content comprises determine times when closed captions are encoded.

Example 28 includes the apparatus of Example 27, wherein determine caption likelihood values for one or more frames of the video content further comprises identify one or more first closed captions that are related to speech, identify one or more second closed captions that are not related to speech, and generate higher caption likelihood values for times associated with the one or more first closed captions.

Example 29 includes the apparatus of Example 28, wherein generate high captions likelihood values comprises generate high caption likelihood values for times when the one or more first closed captions are displayed and attenuate the caption likelihood values over time periods of display of the one or more first closed captions.

Example 30 includes the apparatus of any of Examples 21-29, wherein the alignment module is further configured to operate on the one or more computer processors to generate an alignment for the closed captions based on the determined first and second times and re-align relative presentation of the speech and the closed captions comprises re-align based at least in part on the generated alignment.

Example 31 includes the apparatus of Example 30, wherein generate an alignment for the closed captions comprises perform a linear interpolation on the one or more first times and the one or more second times.

Example 32 includes the apparatus of Example 30, wherein generate an alignment for the closed captions comprises perform a non-linear curve fitting on the one or more first times and the one or more second times.

Example 33 includes the apparatus of Example 30, wherein generate an alignment for the closed captions comprises match recognized speech in the video at the one or more first times with text from closed captions at the one or more second times.

Example 34 includes the apparatus of Example 30, wherein generate an alignment for the closed captions comprises: generate multiple potential closed caption alignments; determine, for each of the potential closed caption alignments, respective quality metrics for the generated potential closed caption alignments; and select a potential closed caption alignment from the generated potential closed caption alignments based at least in part on the determined quality metrics.

Example 35 includes the apparatus of any of Examples 20-34, wherein re-align relative presentation of the speech further comprises modify the video content based on the generated alignment.

Example 36 includes the apparatus of Example 35, wherein modify the video content comprises modify times during which the closed captions are displayed.

Example 37 includes the apparatus of any of Examples 20-36, wherein the video content comprises audio content.

Example 38 includes the apparatus of any of Examples 20-37, wherein the speech identification module, the closed caption identification module, and the alignment module operate prior to provisioning of the video content for presentation.

Example 39 includes one or more computer-readable media containing instructions written thereon that, in response to execution on a computing device, cause the computing device to facilitate presentation of video content. The instructions case the computing device to, prior to presenting the video content: determine, for the video content, one or more first times associated with speech in the video content; determine, for the video content, one or more second times associated with closed captions in the video content; and re-align, relative presentation of the speech and the closed captions in the video content, based on the determined first and second times.

Example 40 includes the computer-readable media of Example 39, wherein determine one or more first times associated with speech comprises determine speech likelihood values for the one or more first times of the video content.

Example 41 includes the computer-readable media of Example 40, wherein determine speech likelihood values comprises determine speech likelihood values based on measure of sound energy of the video content at the one or more first times.

Example 42 includes the computer-readable media of Example 41, wherein the sound energy is sound energy in a frequency range of human speech.

Example 43 includes the computer-readable media of Example 40, wherein determine speech likelihood values comprises perform speech recognition on the video content.

Example 44 includes the computer-readable media of Example 40, wherein determine speech likelihood values comprises perform face recognition to determine when one or more mouths are moving in the video content.

Example 45 includes the computer-readable media of any one of Examples 39-44, wherein determine one or more second times associated with closed captions comprises determine caption likelihood values for the one or more second times of the video content.

Example 46 includes the computer-readable media of Example 45, wherein determine caption likelihood values for one or more times of the video content comprises determine times when closed captions are encoded.

Example 47 includes the computer-readable media of Example 46, wherein determine caption likelihood values for one or more frames of the video content further comprises: identify one or more first closed captions that are related to speech; identify one or more second closed captions that are not related to speech; and generate higher caption likelihood values for times associated with the one or more first closed captions.

Example 48 includes the computer-readable media of Example 47, wherein generate high captions likelihood values comprises generate high caption likelihood values for times when the one or more first closed captions are displayed and attenuate the caption likelihood values over time periods of display of the one or more first closed captions.

Example 49 includes the computer-readable media of any of Examples 39-48, wherein the instructions are further configured to generate an alignment for the closed captions based on the determined first and second times; and re-align relative presentation of the speech and the closed captions comprises re-align based at least in part on the generated alignment.

Example 50 includes the computer-readable media of Example 49, wherein generate an alignment for the closed captions comprises perform a linear interpolation on the one or more first times and the one or more second times.

Example 51 includes the computer-readable media of Example 49, wherein generate an alignment for the closed captions comprises perform a non-linear curve fitting on the one or more first times and the one or more second times.

Example 52 includes the computer-readable media of Example 49, wherein generate an alignment for the closed captions comprises match recognized speech in the video at the one or more first times with text from closed captions at the one or more second times.

Example 53 includes the computer-readable media of Example 49, wherein generate an alignment for the closed captions comprises: generate multiple potential closed caption alignments; determine, for each of the potential closed caption alignments, respective quality metrics for the generated potential closed caption alignments; and select a potential closed caption alignment from the generated potential closed caption alignments based at least in part on the determined quality metrics.

Example 54 includes the computer-readable media of any of Examples 39-53, wherein re-align relative presentation of the speech further comprises modify the video content based on the generated alignment.

Example 55 includes the computer-readable media of Example 54, wherein modify the video content comprises modify times during which the closed captions are displayed.

Example 56 includes the computer-readable media of any of Examples 39-55, wherein the video content comprises audio content.

Example 57 includes the computer-readable media of any of Examples 39-56, wherein determine one or more first times, determine one or more second times, and re-align are performed prior to provisioning of the video content for presentation.

Example 58 includes an apparatus for presenting video content. The apparatus comprises: means for determining, prior to presenting the video content: one or more first times associated with speech in the video content; means for determining, prior to presenting the video content, one or more second times associated with closed captions in the video content; and means for re-aligning relative presentation of the speech and the closed captions in the video content, based on the determined first and second times.

Example 59 includes the apparatus of Example 58, wherein means for determining one or more first times associated with speech comprises means for determining speech likelihood values for the one or more first times of the video content.

Example 60 includes the apparatus of Example 59, wherein means for determining speech likelihood values comprises means for determining speech likelihood values based on measure of sound energy of the video content at the one or more first times.

Example 61 includes the apparatus of Example 60, wherein the sound energy is sound energy in a frequency range of human speech.

Example 62 includes the apparatus of Example 59, wherein means for determining speech likelihood values comprises means for performing speech recognition on the video content.

Example 63 includes the apparatus of Example 59, wherein means for determining speech likelihood values comprises means for performing face recognition to determine when one or more mouths are moving in the video content.

Example 64 includes the apparatus of any one of Examples 58-63, wherein means for determining one or more second times associated with closed captions comprises means for determining caption likelihood values for the one or more second times of the video content.

Example 65 includes the apparatus of Example 64, wherein means for determining caption likelihood values for one or more times of the video content comprises means for determining times when closed captions are encoded.

Example 66 includes the apparatus of Example 65, wherein means for determining caption likelihood values for one or more frames of the video content further comprises: means for identifying one or more first closed captions that are related to speech, means for identifying one or more second closed captions that are not related to speech, and means for generating higher caption likelihood values for times associated with the one or more first closed captions.

Example 67 includes the apparatus of Example 66, wherein means for generating high captions likelihood values comprises means for generating high caption likelihood values for times when the one or more first closed captions are displayed and means for attenuating the caption likelihood values over time periods of display of the one or more first closed captions.

Example 68 includes the apparatus of any of Examples 58-67, wherein the apparatus further comprises means for generating, prior to presentation of the video content, an alignment for the closed captions based on the determined first and second times and means for re-aligning relative presentation of the speech and the closed captions comprises means for re-aligning based at least in part on the generated alignment.

Example 69 includes the apparatus of Example 68, wherein means for generating an alignment for the closed captions comprises means for performing a linear interpolation on the one or more first times and the one or more second times.

Example 70 includes the apparatus of Example 68, wherein means for generating an alignment for the closed captions comprises means for performing a non-linear curve fitting on the one or more first times and the one or more second times.

Example 71 includes the apparatus of Example 68, wherein means for generating an alignment for the closed captions comprises means for matching recognized speech in the video at the one or more first times with text from closed captions at the one or more second times.

Example 72 includes the apparatus of Example 68, wherein means for generating an alignment for the closed captions comprises: means for generating multiple potential closed caption alignments; means for determining, for each of the potential closed caption alignments, respective quality metrics for the generated potential closed caption alignments; and means for selecting a potential closed caption alignment from the generated potential closed caption alignments based at least in part on the determined quality metrics.

Example 73 includes the apparatus of any of Examples 58-72, wherein means for re-aligning relative presentation of the speech further comprises means for modifying the video content based on the generated alignment.

Example 74 includes the apparatus of Example 73, wherein means for modifying the video content comprises means for modifying times during which the closed captions are displayed.

Example 75 includes the apparatus of any of Example 58-74, wherein the video content comprises audio content.

Example 76 includes the apparatus of any of Examples 58-75, wherein means for determining one or more first times, determining one or more second times, and means for re-aligning are performed prior to provisioning of the video content for presentation.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A method comprising:
receiving, by a computing device, a video content, wherein the video content comprises audio data, image data, and closed caption data, and wherein the closed caption data comprises a plurality of captions and a corresponding plurality of times during or at which the corresponding plurality of closed captions are to be displayed during presentation of the video content;
prior to presenting video content:
determining, by the computing device based on at least one of the audio data and the image data, one or more first times associated with speech in the video content;
determining, by the computing device based on the closed caption data, one or more second times associated with closed captions in the video content, wherein the one or more second times are selected from the plurality of times included in the closed caption data; and
re-aligning, by the computing device, relative presentation of the speech and the closed captions in the video content, based on the determined first and second times.

2. The method of claim 1, wherein determining one or more first times associated with speech comprises determining speech likelihood values for the one or more first times of the video content.

3. The method of claim 2, wherein determining speech likelihood values comprises measuring sound energy of the video content at the one or more first times in a frequency range of human speech.

4. The method of claim 1, wherein determining one or more second times associated with closed captions comprises determining caption likelihood values for the one or more second times of the video content.

5. The method of claim 1, wherein determining caption likelihood values for one or more frames of the video content further comprises:
identifying one or more first closed captions that are related to speech;
identifying one or more second closed captions that are not related to speech; and
generating higher caption likelihood values for times corresponding to the one or more first closed captions.

6. The method of claim 5, wherein generating high caption likelihood values comprises:
generating high caption likelihood values for times corresponding to initial display of the one or more first closed captions; and
attenuating the caption likelihood values over time periods of display of the one or more first closed captions.

7. The method of claim 1, wherein re-aligning relative presentation of the speech and the closed captions comprises one or more of performing a linear interpolation on the one or more first times and the one or more second times, performing a non-linear curve fitting on the one or more first times and the one or more second times, or matching recognized speech in the video at the one or more first times with text from closed captions at the one or more second times.

8. The method of claim 1, wherein re-aligning relative presentation of the speech and the closed captions comprises:
generating multiple potential closed caption alignments;
determining, for each of the potential closed caption alignments, respective quality metrics for the generated potential closed caption alignments; and
selecting a potential closed caption alignment from the generated potential closed caption alignments based at least in part on the determined quality metrics.

9. The method of claim 1, wherein re-aligning relative presentation of the speech and the closed captions further comprises modifying the video content based on the generated alignment by modifying one or more of the plurality of times during or at which the closed captions are to be displayed during presentation of the video content.

10. The method of claim 1, wherein the video content comprises audio content.

11. The method of claim 1, wherein determining speech likelihood values comprises performing face recognition to determine when one or more mouths are moving in the video content.

12. An apparatus comprising:
one or more computer processors;
a decoder module configured to operate on the one or more computer processors to receive a video content, wherein the video content comprises audio data, image data, and closed caption data, and wherein the closed caption data comprises a plurality of captions and a corresponding plurality of times during or at which the corresponding plurality of closed captions are to be displayed during presentation of the video content
a speech identification module configured to operate on the one or more computer processors to determine, based on at least one of the audio data and the image data prior to presentation of the video content, one or more first times associated with speech in the video content;
a caption identification module configured to operate on the one or more computer processors to determine, based on the closed caption data prior to presentation of the video content, one or more second times associated with closed captions in the video content, wherein the one or more second times are selected from the plurality of times included in the closed caption data; and
an alignment module, operatively coupled to the speech identification module and the caption identification module, and configured to operate on the one or more computer processors to output, to re-align, prior to presentation of the content, relative presentation of the speech and the captioned content in the video content, based on the determined first and second times.

13. The apparatus of claim 12, wherein determine one or more first times associated with speech comprises determine speech likelihood values for the one or more first times of the video content.

14. The apparatus of claim 13, wherein determine speech likelihood values comprises measure sound energy of the video content at the one or more first times in a frequency range of human speech.

15. The apparatus of claim 12, wherein determine speech likelihood values comprises perform face recognition to determine when one or more mouths are moving in the video content.

16. The apparatus of claim 12, wherein determine speech likelihood values comprises perform speech recognition on the video content.

17. The apparatus of claim 12, wherein the caption identification module is further to:

identify one or more first closed captions that are related to speech; and identify one or more second closed captions that are not related to speech;

wherein the alignment module is to not modify the one or more times in the closed caption data corresponding to the one or more second closed captions.

18. One or more non-transitory computer-readable media comprising instructions written thereon that, in response to execution by one or more processing devices of a computing device, cause the computing device to:

receive a video content, wherein the video content comprises audio data, image data, and closed caption data, and wherein the closed caption data comprises a plurality of captions and a corresponding plurality of times during or at which the corresponding plurality of closed captions are to be displayed during presentation of the video content;

prior to presenting video content:

determine, for the video content based on at least one of the audio data and the image data one or more first times associated with speech in the video content;

determine, for the video content based on the closed caption data, one or more second times associated with closed captions in the video content, wherein the one or more second times are selected from the plurality of times included in the closed caption data; and re-align relative presentation of the speech and the closed captions in the video content, based on the determined first and second times.

19. The non-transitory computer-readable media of claim 18, wherein determine one or more first times associated with speech comprises determine speech likelihood values for the one or more first times of the video content.

20. The non-transitory computer-readable media of claim 19, wherein determine speech likelihood values comprises one or more of measure sound energy of the video content at the one or more first times in a frequency range of human speech.

21. The non-transitory computer-readable media of claim 18, wherein determine speech likelihood values comprises perform face recognition to determine when one or more mouths are moving in the video content.

22. The non-transitory computer-readable media of claim 18, wherein determine speech likelihood values comprises perform speech recognition on the video content.

23. The non-transitory computer-readable media of claim 18, further comprising instructions written thereon that, in response to execution by the one or more processing devices of the computing device, cause the computing device to:

identify one or more first closed captions that are related to speech; and identify one or more second closed captions that are not related to speech;

wherein re-align relative presentation of the speech and the closed captions in the video content comprises not modify the one or more times in the closed caption data corresponding to the one or more second closed captions.

24. An apparatus comprising:

means for receiving a video content, wherein the video content comprises audio data, image data, and closed caption data, and wherein the closed caption data comprises a plurality of captions and a corresponding plurality of times during or at which the corresponding plurality of closed captions are to be displayed during presentation of the video content;

means for determining, based on at least one of the audio data and the image data prior to presenting the video content one or more first times associated with speech in the video content;

means for determining, based on the closed caption data prior to presenting the video content, one or more second times associated with closed captions in the video content, wherein the one or more second times are selected from the plurality of times included in the closed caption data; and means for re-aligning relative presentation of the speech and the closed captions in the video content, based on the determined first and second times.

25. The apparatus of claim 24, further comprising:

means for displaying the video content after re-alignment of the relative presentation of the speech and the closed captions in the video content.

* * * * *